United States Patent
Shin et al.

(10) Patent No.: US 12,538,158 B2
(45) Date of Patent: Jan. 27, 2026

(54) METHOD AND APPARATUS FOR CONTROLLING MEASUREMENT REPORTS IN COMMUNICATION NETWORK INCLUDING INTEGRATED ACCESS AND BACKHAUL NODE

(71) Applicant: ELECTRONICS AND TELECOMMUNICATIONS RESEARCH INSTITUTE, Daejeon (KR)

(72) Inventors: Jae Wook Shin, Daejeon (KR); Sung-Min Oh, Daejeon (KR); Sook Yang Kang, Daejeon (KR); Hyung Deug Bae, Daejeon (KR); Soon Yong Lim, Daejeon (KR); Sung Gu Choi, Daejeon (KR); You Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 283 days.

(21) Appl. No.: 18/506,395

(22) Filed: Nov. 10, 2023

(65) Prior Publication Data
US 2024/0163705 A1    May 16, 2024

(30) Foreign Application Priority Data

Nov. 10, 2022 (KR) .................. 10-2022-0149936
Nov. 8, 2023 (KR) .................. 10-2023-0153678

(51) Int. Cl.
H04W 24/10 (2009.01)

(52) U.S. Cl.
CPC .................. *H04W 24/10* (2013.01)

(58) Field of Classification Search
CPC ..................................... H04W 24/10
See application file for complete search history.

(56) References Cited

U.S. PATENT DOCUMENTS

| 11,490,295 | B2 | 11/2022 | Schmidt et al. |
| 12,425,944 | B2 * | 9/2025 | Li ............ H04W 36/362 |
| 2019/0150213 | A1 | 5/2019 | Kim |
| 2020/0374958 | A1 | 11/2020 | Liu et al. |
| 2021/0051579 | A1 * | 2/2021 | Luo ............ H04W 48/20 |
| 2021/0120517 | A1 | 4/2021 | Akkarakaran et al. |

(Continued)

FOREIGN PATENT DOCUMENTS

| KR | 20220046554 A | 4/2022 |
| WO | 2022149880 A1 | 7/2022 |

*Primary Examiner* — Ashley Shivers
(74) *Attorney, Agent, or Firm* — Rabin & Berdo, P.C.

(57) ABSTRACT

A method of an IAB node may comprise: receiving an RRC message including measurement control information from a base station; transmitting RRC reconfiguration information including the measurement control information to each of a plurality of terminals; receiving a measurement report message including a measurement report generated by each of the plurality of terminals based on the measurement control information from each of the plurality of terminals; and grouping the measurement report messages received from the plurality of terminals into a grouped message report message, and transmitting the grouped measurement report message to the base station according to a grouped measurement reporting periodicity.

15 Claims, 8 Drawing Sheets

(56) References Cited

U.S. PATENT DOCUMENTS

| | | |
|---|---|---|
| 2021/0289567 A1 | 9/2021 | Teyeb et al. |
| 2022/0038164 A1* | 2/2022 | Wei ..................... H04W 88/14 |
| 2022/0377527 A1 | 11/2022 | Abedini et al. |
| 2022/0400427 A1 | 12/2022 | Huang et al. |
| 2023/0308975 A1* | 9/2023 | Lu ..................... H04W 36/087 |

* cited by examiner

METHOD AND APPARATUS FOR CONTROLLING MEASUREMENT REPORTS IN COMMUNICATION NETWORK INCLUDING INTEGRATED ACCESS AND BACKHAUL NODE

CROSS-REFERENCE TO RELATED APPLICATIONS

This application claims priority to Korean Patent Applications No. 10-2022-0149936, filed on Nov. 10, 2022, and No. 10-2023-0153678, filed on Nov. 8, 2023, with the Korean Intellectual Property Office (KIPO), the entire contents of which are hereby incorporated by reference.

BACKGROUND

1. Technical Field

Exemplary embodiments of the present disclosure relate to a measurement control technique, and more specifically, to a technique for minimizing signaling overhead caused by measurement reports of terminals.

2. Related Art

The integrated access backhaul (IAB) technology can expand wireless coverage by providing both wireless access links and wireless backhaul links. In addition, the IAB technology may be a mobile communication wireless relay technology that facilitates backhaul installation at low cost. An IAB node may provide wireless access to terminals or other IAB nodes through access links. The IAB node may access a donor base station through a backhaul link. The IAB node may be classified into a fixed-type or a mobile-type. A multi-hop in which two or more IAB nodes are sequentially connected may be formed.

A terminal connected to a mobile communication network may periodically measure a wireless link status of a current serving cell or neighboring cell. The terminal may perform a measurement procedure to report the measured wireless link status to a base station. The measurement procedure may include a measurement control procedure and a measurement report procedure. The measurement control procedure may refer to a procedure in which the base station transmits measurement configuration information to the terminal. The measurement report procedure may refer to a procedure in which the terminal transmits a measurement report to the base station based on the measurement configuration information. The base station receiving the measurement report from the terminal may determine whether the terminal is to perform a handover to a specific neighboring cell based on the measurement report.

The measurement reporting may be performed in an event-driven or periodic scheme. The periodic measurement reporting may continuously generate uplink signaling overhead. In particular, when measurement reporting is performed in the periodic scheme, signaling overhead on the wireless link may be further increased as the number of terminals connected to the IAB network increases. In addition, when an IAB node performs periodic measurement reporting, the signaling overhead on the wireless link may be further increased as more IAB nodes are connected through multiple hops between the corresponding IAB node and the base station. The mobile-type IAB node may be installed in a mobile transportation means (hereinafter referred to as 'vehicle') such as a bus or Urban Air Mobility (UAM). A passenger carrying the terminal may receive communication services through an access link of the IAB node. Since the terminal has the same mobility as the IAB node and moves with the vehicle, a possibility of performing a handover procedure to another cell may be reduced. Accordingly, the terminal may minimize the measurement procedures for handover. That is, depending on whether the IAB node is a mobile-type or a fixed-type, the terminal connected to the IAB node may perform a different type of measurement control procedure. The terminal can reduce battery consumption and signaling overhead through different types of measurement control procedures.

SUMMARY

Exemplary embodiments of the present disclosure are directed to providing a method and an apparatus for controlling measurement of a terminal connected to an IAB node in a communication network.

According to a first exemplary embodiment of the present disclosure, a method of an integrated access and backhaul (IAB) node may comprise: receiving a radio resource control (RRC) message including measurement control information from a base station; transmitting RRC reconfiguration information including the measurement control information to each of a plurality of terminals; receiving a measurement report message including a measurement report generated by each of the plurality of terminals based on the measurement control information from each of the plurality of terminals; and grouping the measurement report messages received from the plurality of terminals into a grouped message report message, and transmitting the grouped measurement report message to the base station according to a grouped measurement reporting periodicity.

The method may further comprise: transmitting, to the base station, an F1 setup request message including IAB type information indicating an IAB type of the IAB node; and receiving an F1 setup response message from the base station, wherein an IAB type is classified into a mobile-type and a fixed-type, and the IAB type of the IAB node is the mobile-type.

The RRC message may include signaling radio bearer (SRB) addition information for establishing an SRB between each of the plurality of terminals and the IAB node.

The measurement report message may be received from each of the plurality of terminals through the SRB established based on the SRB addition information.

The F1 setup response message may include information on the grouped measurement reporting periodicity for the plurality of terminals.

In the grouping of the measurement report messages and the transmitting of the grouped measurement report message, the grouped measurement report message, which is generated by grouping the measurement report messages, may be transmitted to the base station according to the grouped measurement reporting periodicity.

According to a second exemplary embodiment of the present disclosure, a method of a base station may comprise: receiving, from an integrated access and backhaul (IAB) node, an F1 setup request message including IAB type information indicating an IAB type of the IAB node; in response to identifying that the IAB node is a mobile-type IAB node based on the IAB type information, transmitting an F1 setup response message to the IAB node; transmitting a radio resource control (RRC) message including measurement control information to the IAB node; and receiving, from the IAB node, an RRC group message generated by grouping a plurality of measurement report messages of a plurality of terminals, wherein an IAB type is classified into a mobile-type and a fixed-type, and the IAB type of the IAB node is the mobile-type.

The F1 setup response message may include information on a grouped measurement reporting periodicity for the plurality of terminals.

The RRC message may further include signaling radio bearer (SRB) addition information for establishing an SRB between each of the plurality of terminals and the IAB node.

According to a third exemplary embodiment of the present disclosure, an integrated access and backhaul (IAB) node may comprise at least one processor, and the at least one processor may cause the IAB node to perform: receiving a radio resource control (RRC) message including measurement control information from a base station; transmitting RRC reconfiguration information including the measurement control information to each of a plurality of terminals; receiving a measurement report message including a measurement report generated by each of the plurality of terminals based on the measurement control information from each of the plurality of terminals; and grouping the measurement report messages received from the plurality of terminals into a grouped message report message, and transmitting the grouped measurement report message to the base station according to a grouped measurement reporting periodicity.

The at least one processor may further cause the IAB node to perform: transmitting, to the base station, an F1 setup request message including IAB type information indicating an IAB type of the IAB node; and receiving an F1 setup response message from the base station, wherein an IAB type is classified into a mobile-type and a fixed-type, and the IAB type of the IAB node is the mobile-type.

The RRC message may include signaling radio bearer (SRB) addition information for establishing an SRB between each of the plurality of terminals and the IAB node.

The measurement report message may be received from each of the plurality of terminals through the SRB established based on the SRB addition information.

The F1 setup response message may include information on the grouped measurement reporting periodicity for the plurality of terminals.

In the grouping of the measurement report messages and the transmitting of the grouped measurement report message, the at least one processor may further cause the IAB node to perform: transmitting the grouped measurement report message, which is generated by grouping the measurement report messages, to the base station according to the grouped measurement reporting periodicity.

According to the present disclosure, a donor base station can control a measurement reporting periodicity and parameters differently depending on whether an IAB node connected to a terminal is a fixed-type or mobile-type. The IAB node can group measurement report messages from a plurality of terminals into one transmission message, and transmit it to the base station. The terminal can reduce battery consumption by minimizing unnecessary measurements. In addition, exemplary embodiments of the present disclosure can minimize signaling overhead between the IAB node and the base station.

DETAILED DESCRIPTION OF THE EMBODIMENTS

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system or a memory system to which exemplary embodiments according to the present disclosure are applied will be described. The communication system or memory system to which the exemplary embodiments according to the present disclosure are applied is not limited to the content described below, and the exemplary embodiments according to the present disclosure may be applied to various communication systems. Here, a communication system may be used in the same sense as a communication network.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
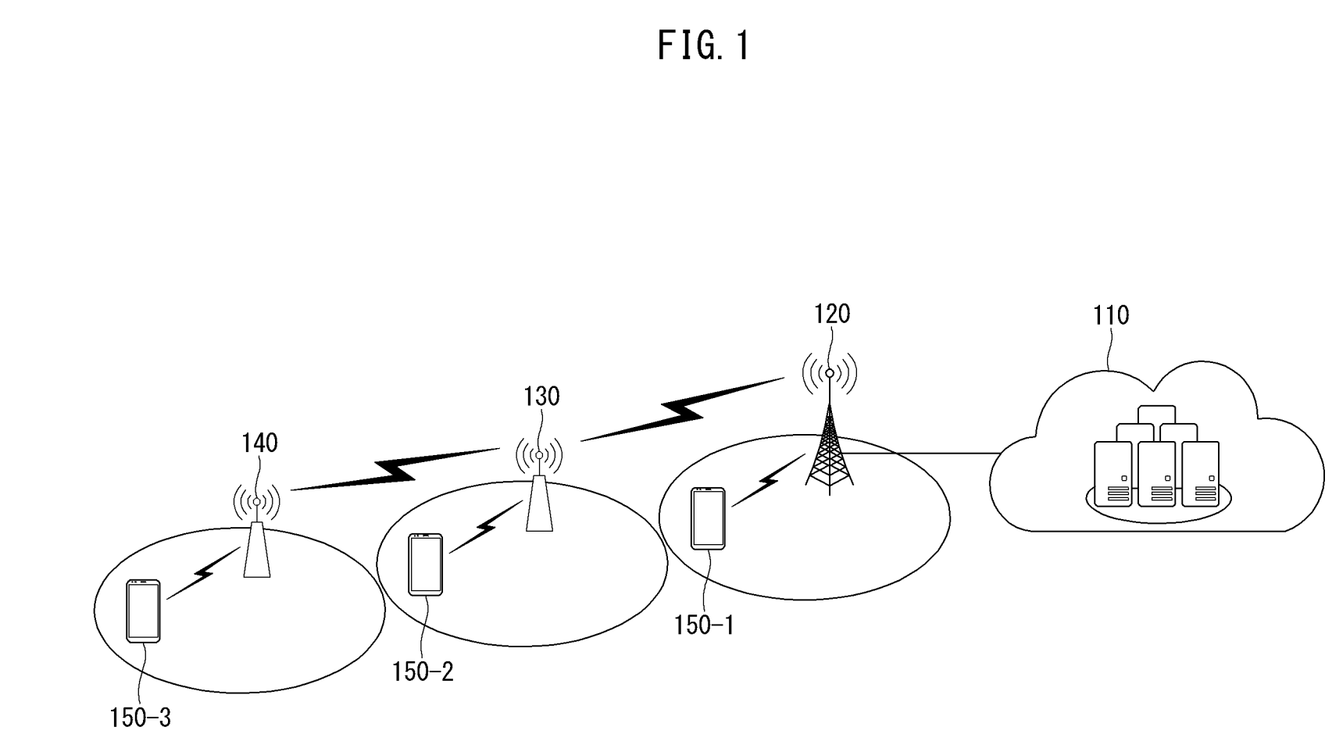
FIG. 1 is a conceptual diagram illustrating an exemplary embodiment of an integrated access and backhaul (IAB) network structure.

FIG. 1 is a conceptual diagram illustrating an exemplary embodiment of an integrated access and backhaul (IAB) network structure.

Referring to FIG. 1, an IAB network 100 may include a core network 110, an IAB donor 120, and/or one or more IAB node 130 and 140. When the IAB network 100 supports 4G communication, the core network 110 may include a serving-gateway (S-GW), a packet data network (PDN)-gateway (P-GW), a mobility management Entity (MME), and the like. When the IAB network 100 supports 5G communication, the core network 110 may include a user plane function (UPF), a session management function (SMF), an access and mobility management function (AMF), and the like.

The IAB donor 120 and/or the IAB nodes 130 and 140 may support 4G communication (e.g., LTE, LTE-A), 5G communication (e.g., NR), 6G communication, and/or the like defined as the 3GPP technical specifications. In addition, the IAB network 100 may include one or more terminals 150-1, 150-2, and 150-3. Meanwhile, the IAB donor 120 and/or one or more IAB nodes 130 and 140 may operate in different frequency bands or may operate in the same frequency band. The IAB donor 120 and/or one or more IAB nodes 130 and 140 may be connected to each other through backhaul links. The IAB donor 120 and/or one or more IAB nodes 130 and 140 may be connected to the core network 110 through backhaul links. Each of the IAB donor 120 and/or one or more IAB node 130 and 140 may transmit signals received from the core network to the corresponding terminals 150-1, 150-2, and 150-3, and transmit signals received from the corresponding terminals 150-1, 150-2, and 150-3 to the core network 110.

Here, the IAB donor 120 may be responsible for centralized controls such as overall path configuration, topology management, handover, data routing path configuration, radio bearer mapping, and the like, according to a central unit (CU)/distributed unit (DU) split structure of the 5G radio access network (RAN). The IAB nodes 130 and 140 may transmit data. In addition, the IAB nodes 130 and 140 may provide services to the terminals 150-2 and 150-2. The IAB donor 120 may have a wired link with the core network 110, and serve as a base station for the IAB node 130 and the terminal 150-1 connected to the IAB network.

The IAB donor 120 may be connected to the core network 110 through a wired interface, and may be connected to the IAB node 130 through a wireless interface. The IAB node 130 may be connected to the IAB node 140 and the IAB donor 120 through wireless interfaces, and may serve as a relay node for the IAB node 140 in downlink and for the IAB donor 120 in uplink.

The IAB node 140 connected to the IAB node 130 may provide services to the terminal 150-3, and may operate in conjunction with the IAB node 130 for data transmission/reception. A backhaul adaptation protocol (BAP) may be used for data relay transmission between the IAB donor 120 and the IAB node 130 or between the IAB nodes 130 and 140. The BAP may perform a multi-hop data relay function, a function of mapping ingress radio link control (RLC) channels and egress RLC channels, and a routing function based RLC channels.

Figure 2:
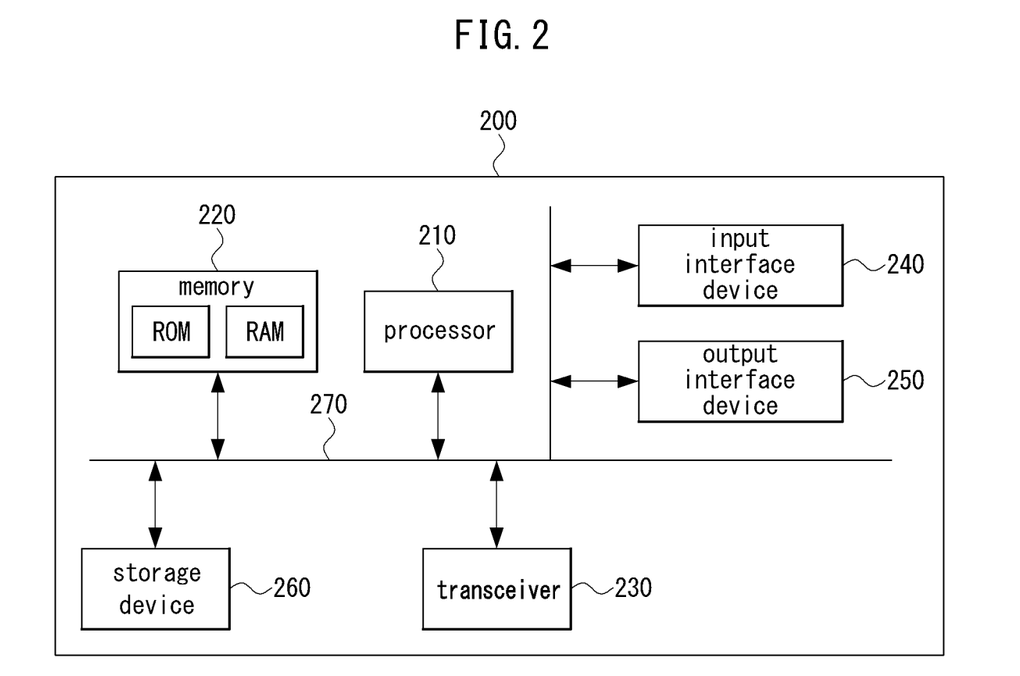
FIG. 2 is a block diagram illustrating an exemplary embodiment of a communication node included in the IAB network.

FIG. 2 is a block diagram illustrating an exemplary embodiment of a communication node included in the IAB network.

Referring to FIG. 2, a communication node 200 included in the IAB network may comprise at least one processor 210, memory 220, and/or transceiver 230. The communication node 200 described above may refer to one of the IAB donor and the IAB node. The above-described processor 210 may receive information on a plurality of divided time resources through the transceiver 230 to transmit and receive signals, and transmit the signals in one of the plurality of divided time resources through the transceiver 230. The above-described one time resource may be determined based on an IAB node list. The above-described transceiver 230 may be referred to as a transmission and reception module, a radio frequency (RF) unit, an RF module, or the like. In addition, the communication node 200 may further comprise an input interface device 240, an output interface device 250, a storage device 260, and the like. The components included in the communication node 100 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, the IAB network will be described in detail. In communication systems, high density of cells may be required to ensure service coverage, which may require installation of a large number of base stations and high maintenance costs. Accordingly, wireless backhauling technology can replace optical cables at low cost, and the IAB network technology can be used therefor. The IAB network can flexibly provide multi-hop-based wireless backhaul in a more cost-effective manner compared to wired backhaul. In addition, the IAB network can flexibly provide one-hop-based wireless backhaul in a more cost-effective manner compared to wired backhaul.

Meanwhile, the IAB nodes may be broadly classified into a fixed-type and a mobile-type. The fixed-type IAB node may be used to cost-effectively cover multiple service coverage holes. Alternatively, the fixed-type IAB node may be used to temporarily provide service coverage to a specific area. In addition, the mobile-type IAB node may be installed in various mobile objects such as vehicles, trains, and drones, and may provide services to devices of passengers on board or embedded Internet of things (IoT) devices.

Figure 3:
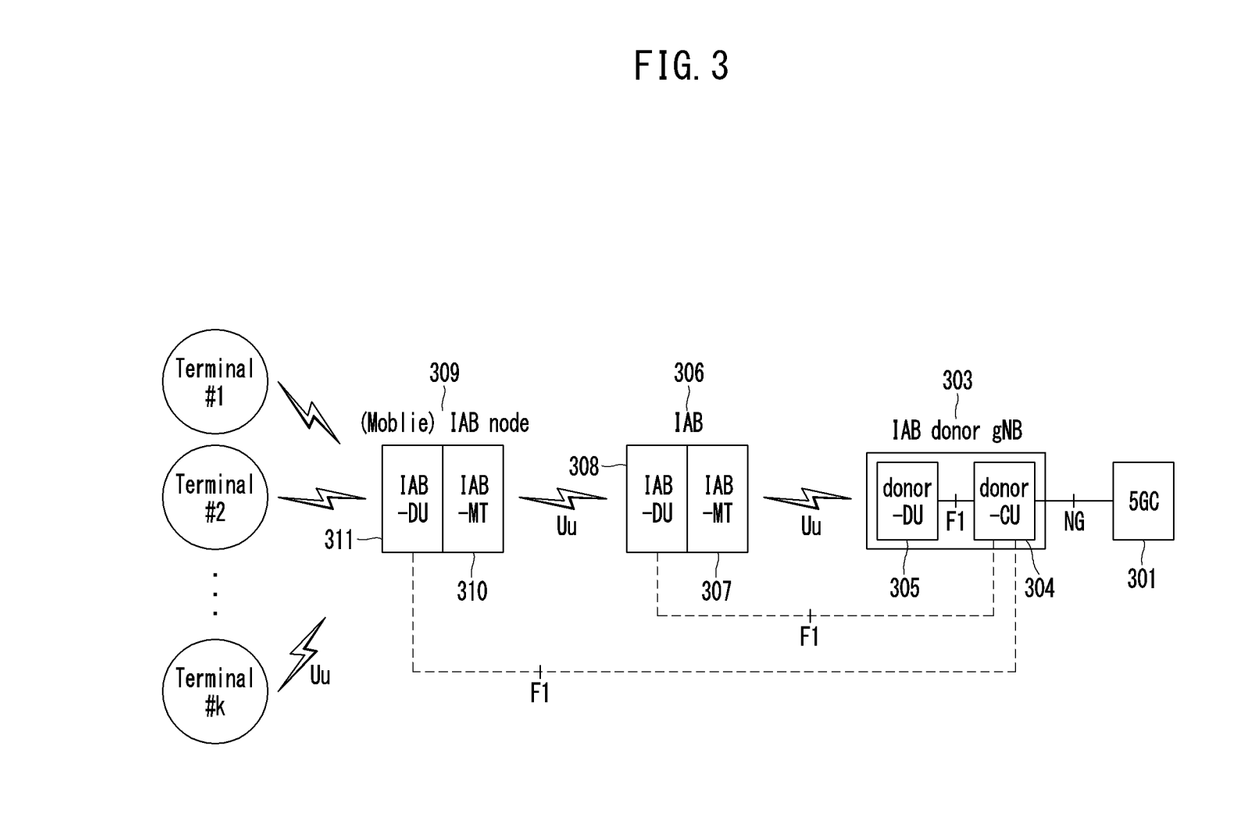
FIG. 3 is a block diagram illustrating a second exemplary embodiment of an IAB network structure.

FIG. 3 is a block diagram illustrating a second exemplary embodiment of an IAB network structure.

Referring to FIG. 3, a structure of the IAB network is illustrated. In addition, FIG. 3 illustrates a mobile communication network structure that provides IAB functionality. The present disclosure relates to a method of controlling measurement reporting between a terminal connected to an IAB 306, the IAB 306, and an IAB donor gNB 303, when the IAB 306 is used as a wireless relay node in a mobile communication network.

The IAB network may include a 5G core network (5GC) 301, the IAB donor gNB 303, the IAB node 306, or a mobile-type (i.e., mobile) IAB node 309. The 5G core network 301 may be connected to a donor-CU 304 of the IAB donor gNB 303 through an NG interface. The IAB donor gNB 303 may be responsible for centralized controls such as overall path configuration, handover, routing configuration, and radio bearer mapping. The IAB donor gNB 303 may be referred to as 'base station'.

The IAB donor gNB 303 may have a split base station structure consisting of a distributed unit (DU) and a central unit (CU). The IAB donor gNB 303 may include the donor-CU 304 that performs an anchor function for control and data transmission/reception of the IAB network and a donor-DU 305 that performs a data transmission/reception function to the IAB node 306. In addition, the IAB donor gNB 303 may comprise at least one donor-CU including the donor-CU 304. The IAB donor gNB 303 may comprise at least one donor-DU including the donor-DU 305. The IAB donor gNB 303 may perform a role of a base station for the IAB 306. In addition, the IAB donor gNB 303 may be a base station that provides wireless connectivity to the IAB 306.

The donor-CU 304 may include upper layers such as radio resource control (RRC), service data adaptation protocol (SDAP), and packet data convergence protocol (PDCP) layers of the IAB donor gNB 303. In addition, the donor-CU 304 may perform the anchor function for control and data transmission/reception of the IAB network. The donor-CU 304 may be connected to the donor-DU 305 by wire through an F1 interface. The donor-CU 304 may be connected to an IAB-DU 308 of the IAB node 306 through an F1 interface. The donor-CU 304 may be wirelessly connected to the IAB-DU 308. The donor-CU 304 may be connected to an IAB-DU 311 of the IAB node 309 through an F1 interface. The donor-CU 304 may be wirelessly connected to the IAB-DU 311. The donor-CU 304 may configure a cell of the donor-DU 305 through the F1 interface.

The donor-DU 305 may include at least one of radio link control (RLC), MAC, and PHY layers of the IAB donor gNB 303. The donor-DU 305 may form one or more cells. The donor-DU 305 may be responsible for a data transmission/reception function to an IAB-mobile terminal (MT) 307. In addition, the donor-DU 305 may be connected to the IAB-MT 307 through an NR Uu interface. The donor-DU 305 may be wirelessly connected to the IAB-MT 307.

The IAB node 306 may include at least one of the IAB-MT 307 and the IAB-DU 308. The IAB node 306 may be divided into the IAB-DU 308, which performs base station functions, and the IAB-MT 307, which performs terminal functions. The IAB node 306 may be referred to as 'IAB'.

The IAB-MT 307 may provide terminal functions to the donor-DU 305. The IAB-MT 307 may include at least one of non-access stratum (NAS), RRC, SDAP, PDCP, RLC, media access control (MAC), or PHY protocol layers to perform the terminal functions. The IAB-MT 307 may connect to another IAB 309 or donor-DU 305 to provide wireless backhaul link functionality. The IAB-MT 307 may be connected to the donor-DU 305 through a Uu interface. The IAB-MT 307 may be wirelessly connected to the donor-DU 305. Meanwhile, the IAB-MT 307 may operate based on configuration according to an RRC message of the donor-CU 304.

The IAB-DU 308 may perform the same function as that of a DU of a base station that provides wireless access link functionality to a user terminal (e.g., user equipment (UE)) or another IAB-MT. The IAB-DU 308 may be connected to the donor-CU 304 through a wireless backhaul link of IAB. Connection between the IAB-DU 308 and the donor-CU 304 may be made through an F1 interface. The IAB-DU 308 may be wirelessly connected to the donor-CU 304. In the F1 interface between the donor-CU 304 of the IAB donor gNB 303 and the IAB-DU 308 of the IAB 306, an F1 application protocol (F1AP) may be used for a control plane, and a general packet radio service tunneling protocol-user plane (GTP-U) may be used a user plane. In addition, the IAB-DU 308 may be connected to the IAB-MT 310 of the mobile IAB node 309 through a Uu interface. The IAB-DU 308 may be wirelessly connected to the IAB-MT 310 of the mobile IAB node 309.

The mobile IAB node 309 may include as at least one of the IAB-MT 310 or the IAB-DU 311. The mobile IAB node 309 may be divided into the IAB-DU 311 that performs base station functions and the IAB-MT 310 that performs terminal functions. The mobile IAB node 309 may be referred to as 'mobile IAB'.

The IAB-MT 310 may provide terminal functions to the IAB-DU 308 of the IAB node 306. The IAB-MT 310 may include at least one of NAS, RRC, SDAP, PDCP, RLC, MAC, and PHY protocol layers to provide the terminal functions. The IAB-MT 310 may connect to another IAB 309 or donor-DU 305 to provide wireless backhaul link functionality. The IAB-MT 310 may be connected to the IAB-DU 308 through a Uu interface. The IAB-MT 310 may be wirelessly connected to the IAB-DU 308. Meanwhile, the IAB-MT 310 may operate based on configuration according to an RRC message of the donor-CU 304, which is delivered by the IAB node 306.

The IAB-DU 311 may perform the same function as that of a DU of a base station that provides wireless access link functionality to a terminal (UE) or another IAB-MT. The IAB-DU 311 may be connected to the donor-CU 304 through a wireless backhaul link of IAB. Connection between the IAB-DU 311 and the donor-CU 304 may be made through an F1 interface. The IAB-DU 311 may be wirelessly connected to the donor-CU 304. In the F1 interface between the donor-CU 304 of the IAB donor gNB 303 and the IAB-DU 311 of the IAB node 309, an F1AP may be used for a control plane, and a GTP-U may be used for a user plane. The IAB-DU 311 may be connected to the terminal through an NR Uu interface. In addition, the IAB-DU 311 may be connected to the donor-CU 304 through an F1 interface.

The terminal may access the network through a Uu interface with the IAB-DU 311. The terminal may operate based on configuration according to an RRC message of the donor-CU 304.

Figure 4:
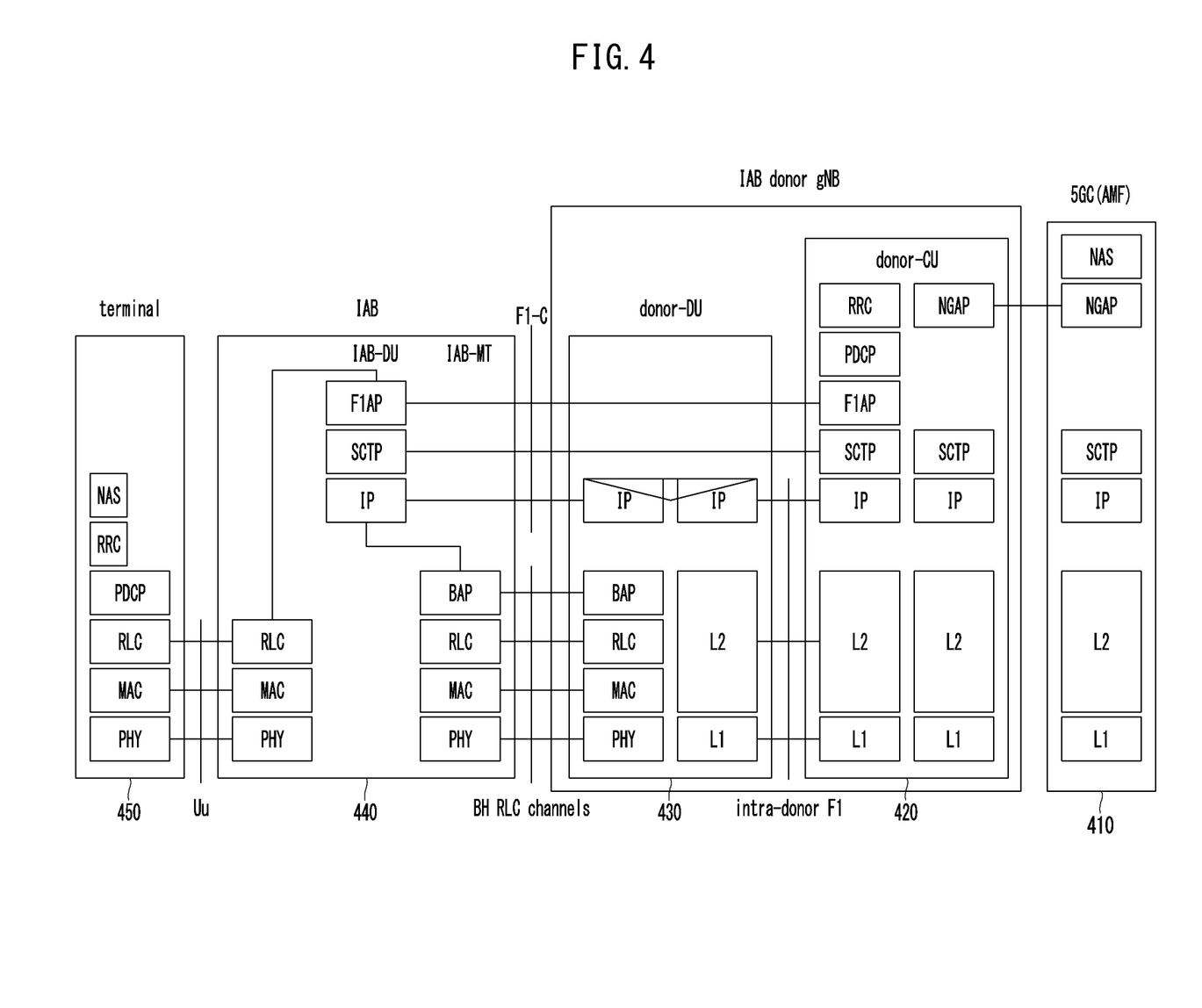
FIG. 4 is a block diagram illustrating an exemplary embodiment of a control plane protocol structure in the IAB network.

FIG. 4 is a block diagram illustrating an exemplary embodiment of a control plane protocol structure in the IAB network.

FIG. 4 illustrates a control plane path and protocol structure between a terminal and a donor-CU in an IAB-supporting mobile communication network. A PDCP layer of a terminal 450 may perform a ciphering and integrity protection procedure on an uplink RRC message. The uplink RRC message may be delivered from the PDCP layer to an RLC layer. The RLC layer of the terminal may transmit the uplink RRC message to an RLC layer of an IAB node 440 through a Uu interface. The RLC layer of the IAB 440 receiving the uplink RRC message may deliver the received uplink RRC message to an IAB-DU. The uplink RRC message may be delivered to the IAB-DU included in the IAB node 440. The IAB-DU may include the uplink RRC message delivered from the terminal in an F1AP protocol message, and transmit the F1AP protocol message to a donor-CU of an IAB donor gNB 430. The F1AP message generated by the IAB-DU may be transmitted through a BAP on a wireless backhaul link established between an IAB-MT and the IAB donor-DU. When the IAB node 440 is connected to the IAB donor gNB 420 through a multi-hop, the RRC message delivered from the terminal 450 may be transmitted to the IAB donor-CU through wireless backhaul links of multiple hops. When the RRC message is transmitted over wireless backhaul links of multiple hops, signaling overhead between the terminal 440, the IAB node 440, and the IAB donor gNB may increase. When the donor-CU receives an upper-layer message through the F1AP, a PDCP layer of the donor-CU may perform an integrity check and deciphering procedure on the upper-layer message and then deliver the upper-layer message to an RRC layer. A downlink RRC message delivered from the donor-CU to the terminal may be transmitted through a processing process reverse to the transmission process of the uplink RRC message. Specifically, the donor-CU may deliver a lower-layer message from the RRC layer to the PDCP layer. The PDCP layer of the donor-CU may perform an integrity check and deciphering procedure on the RRC message. The donor-CU may transmit the RRC message to the IAB node through the F1AP. The IAB may transmit a downlink RRC message to the terminal through a Uu interface via the RLC layer. When the terminal 450 receives the downlink RRC message through the Uu interface, the PDCP layer of the terminal may perform an integrity check and deciphering procedure on the downlink RRC message, and deliver the downlink RRC message to the RRC layer.

Figure 5:
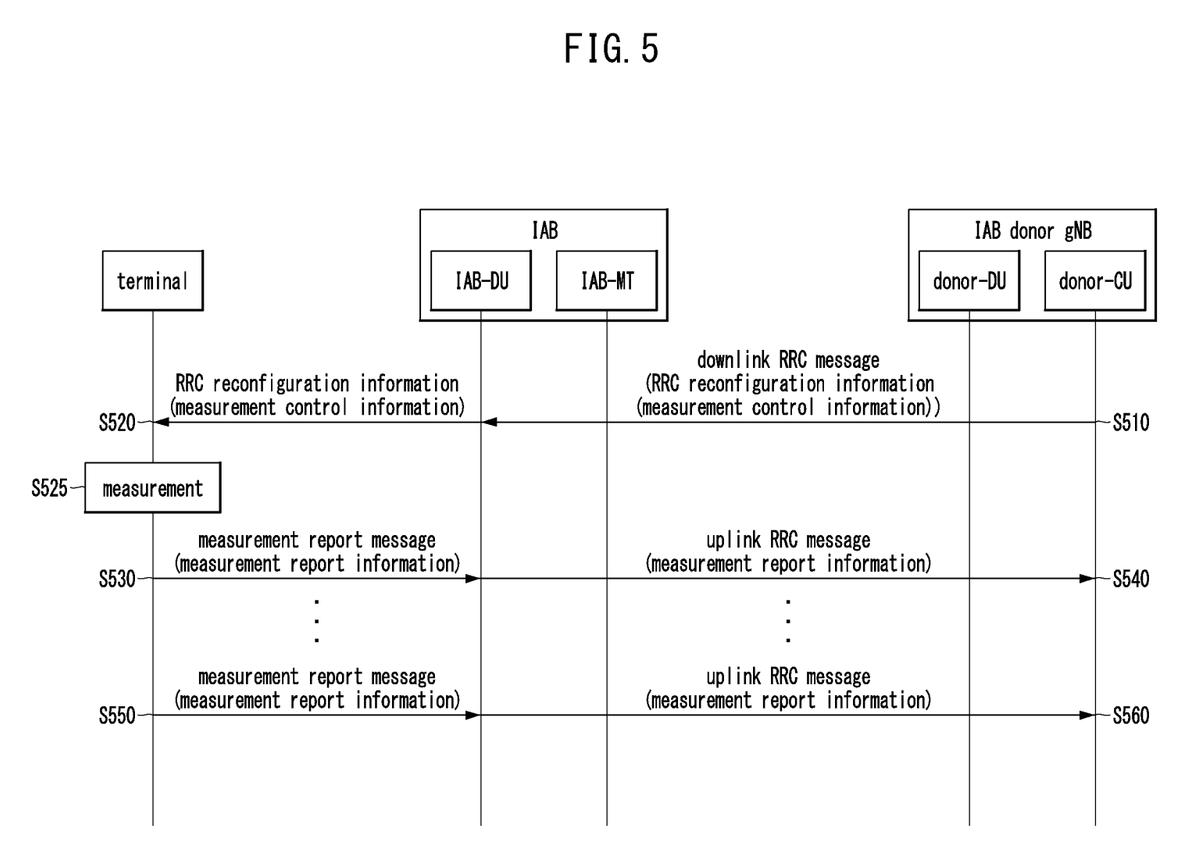
FIG. 5 is a sequence diagram illustrating a first exemplary embodiment of a measurement procedure between a terminal and a donor-CU.

FIG. 5 is a sequence diagram illustrating a first exemplary embodiment of a measurement procedure between a terminal and a donor-CU.

FIG. 5 illustrates a measurement control procedure and a measurement reporting procedure between a terminal connected to an IAB network and a donor-CU. A measurement procedure may be a procedure performed by a terminal in order for a base station to determine whether the terminal is to perform handover. The measurement procedure may refer to a procedure in which the terminal measures wireless signal statuses (e.g., signal strengths) of a currently connected cell and neighboring cells, and reports them to the base station. The measurement procedure may include a measurement control procedure and a measurement reporting procedure. The measurement control procedure may refer to a procedure in which the base station configures measurement with the terminal. The measurement control procedure may be performed as follows.

A donor-CU of an IAB donor gNB may transmit a downlink RRC message to an IAB-DU (S510). The RRC message may include RRC reconfiguration information. The RRC reconfiguration information may include measurement control information. The measurement control information may be transmitted to the terminal as being included in an RRC reconfiguration message or RRC resume message as information elements (IEs). The measurement control information may include configurations for measurement targets (e.g., neighboring cells of the same frequency) of the terminal, measurement quantity (e.g., received signal strength), and measurement reporting scheme. The IAB-DU may receive the downlink RRC message transmitted by the IAB donor gNB.

The IAB-DU may transmit the RRC reconfiguration information to the terminal (S520). The terminal may receive the RRC reconfiguration information transmitted by the IAB-DU. The terminal may perform a measurement reporting procedure to notify the IAB donor gNB of measurement results. The measurement reporting procedure may refer to a procedure in which the terminal measures the wireless link statuses based on a measurement command and transmit the measurement results to the base station. The measurement reporting procedure may be performed as follows.

The terminal may perform the measurement procedure based on the RRC reconfiguration information (S525). The terminal may generate measurement report information through the measurement procedure. The terminal may transmit the measurement report information to the IAB-DU (S530). The measurement report information may be transmitted as being including a measurement report message. The measurement report information may be transmitted through an event-based scheme or a periodic scheme. The event-based scheme may refer to a scheme of reporting when a specific condition is satisfied. The periodic scheme may refer to a scheme of reporting at regular intervals. The IAB-DU may receive the measurement report information transmitted by the terminal. The IAB-DU may transmit an uplink RRC message to the donor-CU. The RRC message may include the measurement report information. The measurement report information may be transmitted as an RRC measurement report message. The donor-CU may receive the uplink RRC message transmitted by the IAB-DU.

The terminal may transmit the measurement report message to the IAB-DU (S550). The measurement report information may be transmitted to the IAB-DU in the periodic scheme. The IAB-DU may receive the measurement report message transmitted by the terminal.

The IAB-DU may generate an uplink RRC message based on the received measurement report message. The IAB-DU may transmit the uplink RRC message to the donor-CU (S560). The donor-CU may receive the uplink RRC message transmitted by the IAB-DU. Periodically-generated measurement report information may be transmitted to the donor-CU in the periodic scheme.

In other words, the RRC message between the terminal and the donor-CU may be transmitted through an F1 interface between the IAB-DU and the donor-CU. In addition, the RRC message between the terminal and the donor-CU may be transmitted as being included in a downlink RRC message (DL RRC MESSAGE TRANSFER) or an uplink RRC message (UL RRC MESSAGE TRANSFER) of the F1AP protocol.

Figure 6:
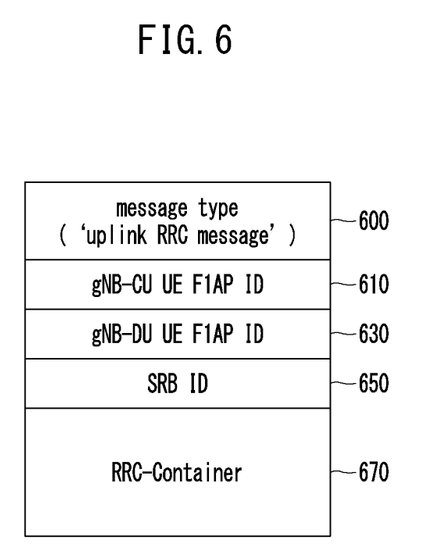
FIG. 6 is a conceptual diagram illustrating a first exemplary embodiment of an F1AP message structure.

FIG. 6 is a conceptual diagram illustrating a first exemplary embodiment of an F1AP message structure.

Referring to FIG. 6, an FLAP message structure for delivering an uplink RRC message is illustrated. The F1AP message may include at least one of a message type, gNB-CU UE F1AP ID, gNB-DU UE F1AP ID, SRB ID, or RRC-Container. The F1AP message may convey an uplink RRC message such as measurement report information from the IAB-DU to the donor-CU through the F1 interface.

The message type of the FLAP message in the present exemplary embodiment may indicate 'uplink RRC message'. The uplink RRC message may be transmitted as being included in the RRC-Container (670) field of the F1AP message. The SRB ID 650 may indicate an identifier of a signaling bearer through which the RRC message is delivered. Since the uplink RRC message may be a UE-specific message, the F1AP message may include gNB-CU UE F1AP ID and gNB-DU UE FLAP ID to identify the terminal corresponding to the uplink RRC message.

Figure 7:
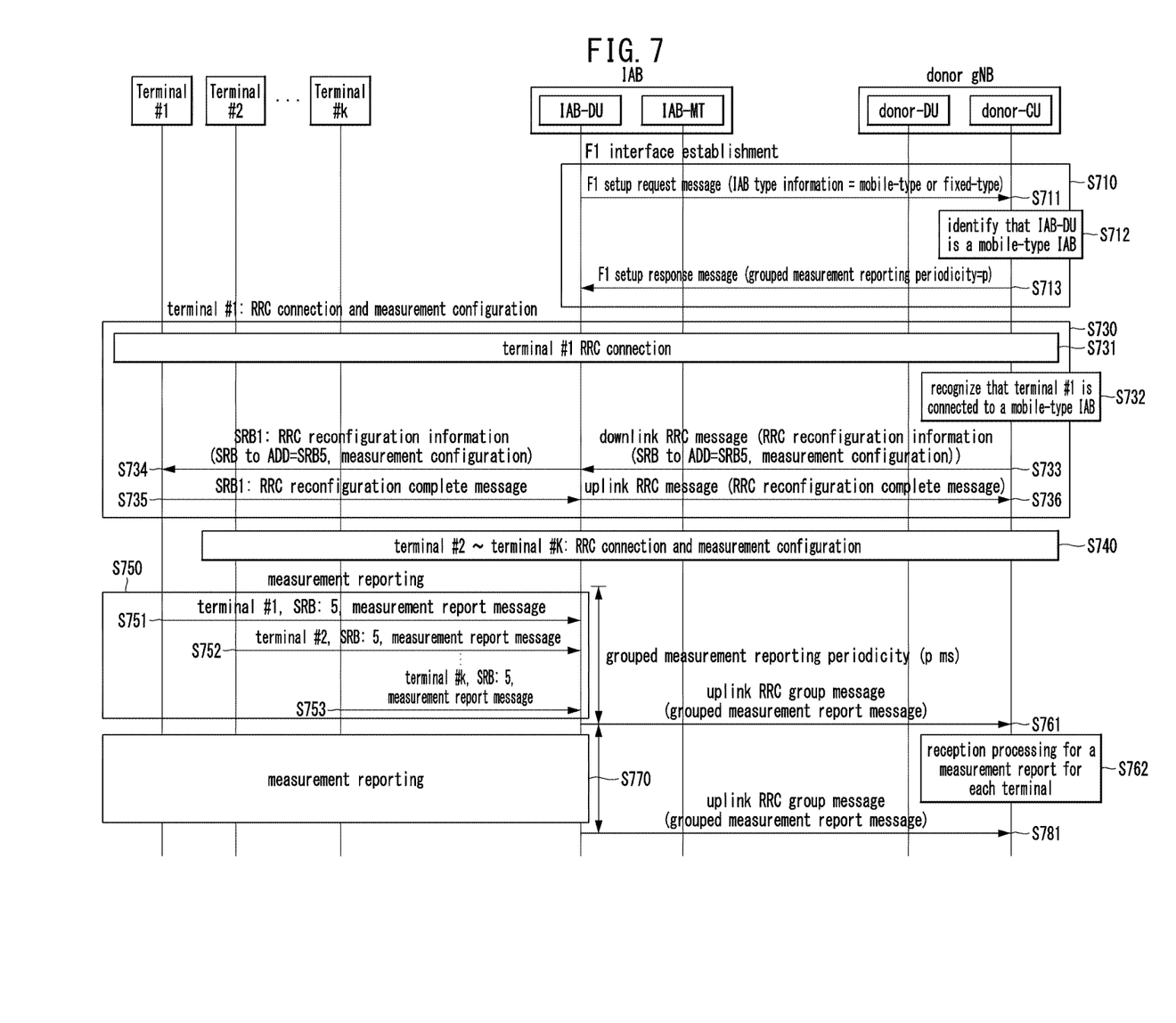
FIG. 7 is a sequence diagram illustrating a second exemplary embodiment of a measurement procedure between a terminal and a donor-CU.

FIG. 7 is a sequence diagram illustrating a second exemplary embodiment of a measurement procedure between a terminal and a donor-CU.

Referring to FIG. 7, a measurement control procedure and a measurement reporting procedure between a terminal, an IAB-DU, and a donor-CU are illustrated. When the IAB node is a mobile IAB node installed on a moving vehicle such as a bus, the terminal carried by a passenger may achieve reliable wireless access with the mobile IAB-DU while moving with the vehicle. The terminal connected to the mobile IAB-DU may not need to perform a handover procedure with a neighboring cell outside the vehicle. The donor-CU may transmit a measurement control command to the terminal connected to the IAB node depending on whether the IAB node is a mobile-type or a fixed type. In addition, the donor-CU may set a measurement periodicity of a terminal connected to a mobile IAB node to a value greater than a measurement periodicity of a terminal connected to a fixed IAB node. When the donor-CU sets a measurement periodicity of a terminal connected to a mobile IAB node to a value greater than a measurement periodicity of a terminal connected to a fixed IAB node, the terminal connected to the mobile IAB node may minimize measurement targets or a measurement range for the wireless link statuses. In addition, the donor-CU may configure the terminal connected to the mobile IAB node not to perform measurements. Therefore, the donor-CU may need to determine whether the IAB node connected to the terminal is fixed-type or mobile-type in order to control the measurement procedure of the terminal. A procedure for the donor-CU to determine whether the IAB node connected to the terminal is a fixed-type or a mobile-type may be performed as follows.

The IAB-DU and the donor-CU may perform an F1 interface establishment procedure (S710). During the F1 interface establishment procedure between the IAB-DU and the donor-CU, the IAB-DU may transmit an F1 setup request message to the donor-CU (S711). The F1 setup request message may include IAB type (i.e., fixed-type or mobile-type) information. The IAB type information may refer to information on whether the IAB node is fixed-type or mobile-type. The donor-CU may receive the F1 setup request message transmitted by the IAB-DU.

The donor-CU may recognize whether the IAB-DU is a mobile-type IAB node through the F1 setup request message transmitted by the IAB-DU (S712). When the IAB-DU is a mobile-type IAB node, the donor-CU may transmit an F1 setup response message to the IAB-DU (S713). The F1 setup response message may include information on a grouped measurement reporting periodicity. The grouped measurement reporting periodicity may be referred to as p. p, which is grouped measurement reporting periodicity, may mean a periodicity (value) that is configurable by the donor-CU. The IAB-DU may receive the F1 setup response message transmitted by the donor-CU.

A terminal #1 may perform an RRC connection procedure and a measurement configuration procedure (S730). The terminal #1 may access the IAB node and establish an RRC connection with the donor-CU. When the terminal #1 accesses the IAB node and completes RRC connection establishment with the donor-CU, the donor-CU may determine whether the terminal #1 is a terminal connected to a fixed-type IAB node or a terminal connected to a mobile-type IAB node based on the RRC connection (S732).

When the terminal #1 is connected to the IAB node, the donor-CU may perform a measurement control procedure to perform measurement configuration by transmitting RRC reconfiguration information to the terminal #1. The measurement control procedure may be performed as follows.

The donor-CU may transmit a downlink RRC message to the IAB-DU (S733). The downlink RRC message may include the RRC reconfiguration information. The RRC reconfiguration information may include measurement control information. The RRC reconfiguration information may include a measurement configuration command. In addition, the RRC reconfiguration information may include measurement configuration information or 'SRB to ADD' information for SRB addition. The IAB-DU may receive the downlink RRC message transmitted by the donor-CU.

In the existing mobile communication system, the RRC message may be transmitted through a signaling bearer 1 (SRB1) in a wireless section between the terminal and the IAB-DU. The IAB-DU may group measurement report messages received from a plurality of terminals into a grouped measurement report message. The IAB-DU may need to identify each measurement report message in order to deliver the grouped measurement report message to the donor-CU. If a measurement report message is encrypted in the lower PDCP layer and transmitted to the IAB-DU as in the existing system, it may be difficult for the IAB-DU to identify the measurement report message among several RRC messages transmitted through the SRB1.

In order to identify the measurement report message, the present disclosure may newly define a dedicated SRB5 used for the terminal connected to the IAB node to transmit the measurement report message. In the case, the donor-CU may include the measurement control information element including SRB addition information that allow the terminal to establish the SRB5 and measurement control parameters in the RRC reconfiguration information. The SRB addition information may be referred to as SRB additional configuration indication information (i.e., SRB to ADD=SRB5).

The IAB-DU may transmit the RRC reconfigured information to the terminal #1 (S734). The RRC reconfiguration information may be transmitted through the SRB1. The terminal #1 may receive the RRC reconfiguration information transmitted by the IAB-DU. The terminal #1 may generate a reconfiguration complete message based on the received RRC reconfiguration information.

The terminal #1 may transmit the generated reconfiguration complete message to the IAB-DU (S735). The terminal #1 may transmit the RRC reconfiguration complete message through the SRB1. The IAB-DU may receive the RRC reconfiguration complete message transmitted by the terminal #1. The IAB-DU may transmit an uplink RRC message to the donor-CU (S736). The uplink RRC message may include the RRC reconfiguration complete message. The donor-CU may receive the uplink RRC message transmitted by the IAB-DU.

The donor-CU may perform an RRC connection establishment procedure and a measurement configuration procedure with other terminals (S740). Other terminals may mean terminal #2 to terminal #k. k may be an integer value. The step S740 may correspond to the step S730. In other words, the procedure (e.g., S730) for establishing the RRC connection and measurement configuration for the terminal #2 may be performed identically or similarly to the procedure for establishing the RRC connection and configuring measurement for the terminal #1 (e.g., S730).

According to the present disclosure, the measurement reporting procedure may be performed when the measurement control procedure for the terminal is completed. The measurement reporting procedure may be performed as follows. The terminals RRC-connected to the donor-CU may perform measurement reporting procedures with the IAB-DU (S750). The measurement reporting procedure may refer to a procedure in which the terminal measures and transmits measurement report information to the IAB-DU. Each of the terminals (i.e., terminals #1 to #k) may configure an SRB5 based on the RRC reconfiguration information including the SRB addition information.

The terminal #1 may transmit a measurement report message to the IAB-DU (S751). The IAB-DU may receive the measurement report message transmitted by the terminal #1. The terminal #2 may transmit a measurement report message to the IAB-DU (S752). The IAB-DU may receive the measurement report message transmitted by the terminal #2. The terminal #k may transmit a measurement report message to the IAB-DU (S753). The IAB-DU may receive the measurement report message transmitted by the terminal #k. The measurement report message may be transmitted through the SRB5.

The IAB-DU may accumulate the measurement report messages received from the terminals through the SRB5 for a predetermined period (i.e., period corresponding to a periodicity). The predetermined period (periodicity) may be p, which is the grouped measurement reporting periodicity. In addition, p may be a transmission periodicity of an uplink RRC group message (i.e., grouped measurement report). The IAB-DU may transmit the grouped measurement report message by including it in an RRC group transmission message (i.e., UL RRC MESSAGE GROUP TRANSFER message) (S761).

The donor-CU may control the transmission periodicity of the uplink RRC group message by controlling p. When the donor-CU receives the uplink RRC group message, the donor-CU may perform a measurement report reception processing procedure for each terminal (S762).

Figure 8:
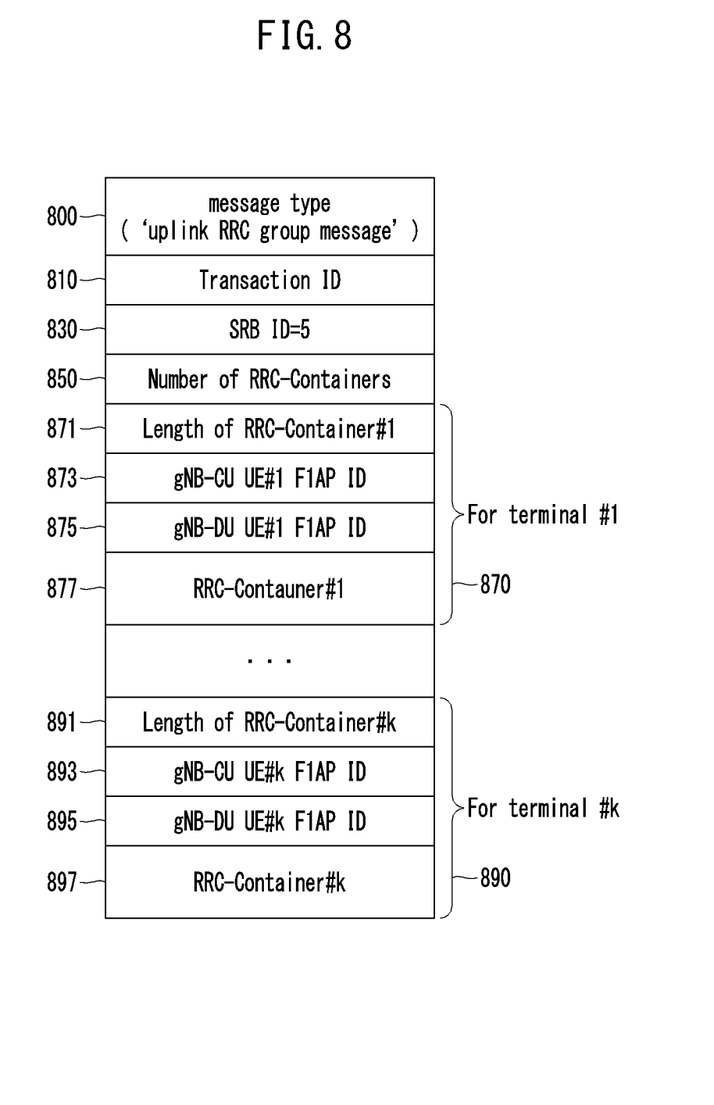
FIG. 8 is a conceptual diagram illustrating a second exemplary embodiment of an F1AP message structure.

FIG. 8 is a conceptual diagram illustrating a second exemplary embodiment of an F1AP message structure.

Referring to FIG. 8, a structure of an FLAP message for grouping measurement report messages received from a plurality of terminals into one F1AP message and delivering the on FLAP message to the donor-CU is illustrated. When a plurality of terminals are connected to an IAB node, each terminal may perform a measurement control procedure and a measurement reporting procedure with the donor-CU. In particular, when measurement report information is transmitted in the periodic scheme, signaling overhead on the F1 interface between the terminal and the donor-CU may increase. Accordingly, the present disclosure may propose a method of reducing signaling overhead on the F1 interface when a plurality of terminals are connected to the IAB node.

The uplink RRC group message may include at least one of a message Type 800, transaction ID 810, SRB ID 830, or number of RRC-Containers 850 as fixed fields. The uplink RRC group message may include fields for the terminal. The fields 870 and 890 for the terminal include 'Length of RRC-Container' 871 and 891, gNB-CU UE F1AP ID 873 and 893, gNB-DU UE FLAP ID 875 and 895, and RRC-Containers 877 and 897.

In the present disclosure, the message type 800 may indicate 'uplink RRC message group transmission'. The transaction ID 810 may indicate an identifier of a transaction for the uplink RRC message group transmission. The SRB ID 830 may indicate a signaling bearer. The SRB ID 830 may indicate the SRB5 for the purpose of grouping and delivering messages from multiple terminals connected to the IAB-DU. The number of RRC-Container 850 may refer to the number of terminals connected to the IAB node and transmitting the measurement report messages. The length of RRC-container #k 891 may indicate the length of the RRC-container transmitted by the terminal #k. The length of the RRC-Container may be expressed in bytes. The gNB-CU UE #k F1AP ID 893 may indicate an identifier of an F1AP layer of the terminal #k managed by the gNB-CU. The gNB-DU UE #k F1AP ID 895 may indicate an identifier of an F1AP layer of the terminal #k managed by the gNB-DU or the IAB-DU. The RRC-container #k 897 may refer to the RRC message transmitted by the terminal #k. Specifically, the measurement report message may be included in the RRC-container #k (897).

Meanwhile, the uplink RRC group message may include fields for as many terminals as the value of the number of RRC-container 850. For example, when Number of RRC-Container is set to 4, there may be a total of 4 sets of {Length of RRC-Container, gNB-CU UE F1AP ID, gNB-DU UE F1AP ID, RRC-Container}.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of an integrated access and backhaul (IAB) node, comprising:
   receiving a radio resource control (RRC) message including measurement control information from a base station;
   transmitting RRC reconfiguration information including the measurement control information to each of a plurality of terminals;
   receiving a measurement report message including a measurement report generated by each of the plurality of terminals based on the measurement control information from each of the plurality of terminals; and
   grouping the measurement report messages received from the plurality of terminals into a grouped message report message, and transmitting the grouped measurement report message to the base station according to a grouped measurement reporting periodicity.

2. The method according to claim 1, further comprising:
   transmitting, to the base station, an F1 setup request message including IAB type information indicating an IAB type of the IAB node; and
   receiving an F1 setup response message from the base station,
   wherein an IAB type is classified into a mobile-type and a fixed-type, and the IAB type of the IAB node is the mobile-type.

3. The method according to claim 1, wherein the RRC message includes signaling radio bearer (SRB) addition information for establishing an SRB between each of the plurality of terminals and the IAB node.

4. The method according to claim 3, wherein the measurement report message is received from each of the plurality of terminals through the SRB established based on the SRB addition information.

5. The method according to claim 2, wherein the F1 setup response message includes information on the grouped measurement reporting periodicity for the plurality of terminals.

6. The method according to claim 5, wherein in the grouping of the measurement report messages and the transmitting of the grouped measurement report message, the grouped measurement report message, which is generated by grouping the measurement report messages, is transmitted to the base station according to the grouped measurement reporting periodicity.

7. A method of a base station, comprising:
   receiving, from an integrated access and backhaul (TAB) node, an F1 setup request message including IAB type information indicating an IAB type of the IAB node;
   in response to identifying that the IAB node is a mobile-type IAB node based on the IAB type information, transmitting an F1 setup response message to the IAB node;
   transmitting a radio resource control (RRC) message including measurement control information to the IAB node; and
   receiving, from the IAB node, an RRC group message generated by grouping a plurality of measurement report messages of a plurality of terminals,
   wherein an IAB type is classified into a mobile-type and a fixed-type, and the IAB type of the IAB node is the mobile-type.

8. The method according to claim 7, wherein the F1 setup response message includes information on a grouped measurement reporting periodicity for the plurality of terminals.

9. The method according to claim 7, wherein the RRC message further includes signaling radio bearer (SRB) addition information for establishing an SRB between each of the plurality of terminals and the IAB node.

10. An integrated access and backhaul (IAB) node comprising at least one processor, wherein the at least one processor causes the IAB node to perform:
    receiving a radio resource control (RRC) message including measurement control information from a base station;
    transmitting RRC reconfiguration information including the measurement control information to each of a plurality of terminals;
    receiving a measurement report message including a measurement report generated by each of the plurality of terminals based on the measurement control information from each of the plurality of terminals; and
    grouping the measurement report messages received from the plurality of terminals into a grouped message report message, and transmitting the grouped measurement report message to the base station according to a grouped measurement reporting periodicity.

11. The IAB node according to claim 10, wherein the at least one processor further causes the IAB node to perform:
    transmitting, to the base station, an F1 setup request message including IAB type information indicating an IAB type of the IAB node; and
    receiving an F1 setup response message from the base station,
    wherein an IAB type is classified into a mobile-type and a fixed-type, and the IAB type of the IAB node is the mobile-type.

12. The IAB node according to claim 10, wherein the RRC message includes signaling radio bearer (SRB) addition information for establishing an SRB between each of the plurality of terminals and the IAB node.

13. The IAB node according to claim 12, wherein the measurement report message is received from each of the plurality of terminals through the SRB established based on the SRB addition information.

14. The IAB node according to claim 11, wherein the F1 setup response message includes information on the grouped measurement reporting periodicity for the plurality of terminals.

15. The IAB node according to claim 14, wherein in the grouping of the measurement report messages and the transmitting of the grouped measurement report message, the at least one processor further causes the IAB node to perform: transmitting the grouped measurement report message, which is generated by grouping the measurement report messages, to the base station according to the grouped measurement reporting periodicity.

* * * * *